(12) United States Patent
Bausenwein et al.

(10) Patent No.: US 7,597,187 B2
(45) Date of Patent: Oct. 6, 2009

(54) CONVEYOR SYSTEM

(75) Inventors: Alfred Bausenwein, Thüngersheim (DE); Peter Schmitt, Würzburg (DE)

(73) Assignee: KBA-Metronic AG, Veitshochheim (DE)

( * ) Notice: Subject to any disclaimer, the term of this patent is extended or adjusted under 35 U.S.C. 154(b) by 3 days.

(21) Appl. No.: 12/055,340

(22) Filed: Mar. 26, 2008

(65) Prior Publication Data

US 2008/0236996 A1    Oct. 2, 2008

(51) Int. Cl.
*B65G 35/00* (2006.01)

(52) U.S. Cl. ...................... 198/619; 198/580

(58) Field of Classification Search ............... 198/619, 198/690.1, 580, 465.2, 472.1
See application file for complete search history.

(56) References Cited

U.S. PATENT DOCUMENTS

| | | | | |
|---|---|---|---|---|
| 4,766,993 A | * | 8/1988 | Kita et al. ................ | 198/619 |
| 5,190,136 A | * | 3/1993 | Grecksch et al. ....... | 198/370.13 |
| 5,720,377 A | * | 2/1998 | Lapeus et al. ........... | 198/619 |
| 6,092,801 A | * | 7/2000 | Abbadessa et al. ..... | 198/805 |
| 6,206,176 B1 | * | 3/2001 | Blonigan et al. ........ | 198/619 |
| 6,240,843 B1 | | 6/2001 | Krueger et al. .......... | 101/232 |
| 2002/0012556 A1 | | 1/2002 | Niestrath ................ | 400/76 |
| 2002/0060409 A1 | | 5/2002 | Hess et al. .............. | 271/198 |
| 2005/0093224 A1 | | 5/2005 | Frank et al. ............. | 271/222 |
| 2007/0013328 A1 | | 1/2007 | Shemm .................. | 318/135 |

FOREIGN PATENT DOCUMENTS

DE    2501963    12/1975
DE    10141589    4/2002

* cited by examiner

*Primary Examiner*—James R Bidwell
(74) *Attorney, Agent, or Firm*—Andrew Wilford

(57) ABSTRACT

A conveyor system has an elongated guide defining a closed transport path extending through a plurality of treatment stations and a plurality of carriers movable on the guide along the path and each capable of holding a respective workpiece. At least one magnet is provided on each carrier, and an annular row of individually energizeable electromagnets extends along the path and is capable of exerting force on the magnets of the carriers so as to displace the respective carriers along the path. A plurality of sensors spaced along the path detect the carriers and generate outputs indicating positions and movement of the carriers along the path. At least some of the electromagnets at least intermittently form some of the sensors.

10 Claims, 7 Drawing Sheets

CONVEYOR SYSTEM

FIELD OF THE INVENTION

The invention relates to a conveyor system having a plurality of carriers that can be transported along a transport path on a guide, particularly in order to transport workpieces to be printed through treatment stations of a printing machine. The invention furthermore relates to a method of operating such a conveyor system.

BACKGROUND OF THE INVENTION

Conveyor systems for transporting workpieces by means of carriers along a transport path are known. The carriers are designed for example to carry workpieces and are moved in guides along a typically closed or annular transport path. As the carriers travel around the path they move the respective workpieces they carry through a plurality of treatment stations integrated with the transport path.

These work stations can for example be treatment stations of a printing machine, such as loading and removing stations, printing mechanisms, lacquering mechanisms, drying units, identification units and the like. The workpieces can for example be any type of objects which are to be printed, such as cards, data media—CD's, DVD's—or the like. A conveyor system can thus form a part of a printing machine but also be used for any other application in which workpieces are to be transported.

Transporting the carriers in the known conveyor systems is done for example in that the carriers are attached to circumferential chains or conveyor belts or are at least in sections are moved along by them in the carriers by respective grippers or pushers, the conveyor chains or the conveyor belts being driven at least in sections by a common drive.

This is disadvantageous in that the carriers at least in sections invariably have the same displacement mode, such as all moving continuously or in steps. Processing stations that require different work movements or displacement modes of the carriers can thus not be provided along the path, or at least on the path near another station requiring a different displacement mode. If this is required for one production sequence though, then it is necessary to correspondingly combine a plurality of conveyors working with different work movements into one joint conveyor system.

Hence, the carriers have to be moved smoothly between conveyor transport-path sections that work with a different displacement modes. However, integrating such systems presents a number of problems, since the respective adjacent conveyor units have to work precisely synchronous with each other during the transfer of a carrier to a downstream conveyor, in order to avoid vibration, impacts and the like to the carriers and thus to the workpieces, since they can severely disrupt the production process.

Furthermore, it is possible only with difficulty, particularly with mechanical delivery of the carriers between succeeding conveyors that are working differently, to make later adjustments or process changes in the work movement, such that a conveyor system of this kind has limited flexibility.

It is furthermore disadvantageous that the necessary positioning accuracy of a carrier within a treatment station is guaranteed exclusively by the conveyor system only within limits, since only average accuracy can be achieved due to workpiece tolerances, conveyor tolerances and wear. Accuracy will deteriorate in the course of operations.

In order to achieve the required accuracy within a treatment station, it is therefore usually necessary to uncouple the carrier with the workpiece attached to it from the conveyor at least for a short time during treatment and to align it accordingly with external devices. After completed treatment, the carrier must then be reconnected to the conveyor. Obviously such a procedure can only function within a substantially inflexible functional sequence in order to suppress the above-mentioned disturbing influences.

For this reason it is virtually impossible once the system is set up and operating to make changes in the functional sequence for the optimizing or for implementing other or new treatments into an existing functional sequence and thus into an existing conveyor system.

In another embodiment of known conveyor systems, the carriers are moved for example by means of a screw conveyor subdivided into sections along the transport path, in that one or a plurality of pusher elements attached to the carriers engage in one or a plurality of screwthreads of the screw conveyor and are moved along during the rotation of the screw conveyor via the pitch of the screwthreads. Different transportation speeds of the carriers can be achieved depending on the embodiment of the pitch profiles along the individual screws.

This type of conveyor system has the disadvantage that this type of movement invariably only allows an unalterable speed profile, depending substantially on the design of the screw. It is furthermore unfavorable that this type of conveyance is possible merely within a straight section of the entire transport path, so that delivery to a conveyor system that is working differently has to take place at each end of a conveyor screw, which is usually complex and problematic, as already explained.

OBJECTS OF THE INVENTION

It is therefore an object of the present invention to provide an improved conveyor system.

Another object is the provision of such an improved conveyor system that overcomes the above-given disadvantages, in particular that avoids the above-mentioned disadvantages.

A further object is to provide a method and an apparatus device with which it is possible to control a plurality of, in particular a specified number of carriers, along a largely closed transport path at any time in a way, such that each carrier can be controlled in its movement individually at least within defined limits, particularly when no delivery between differently working conveyor types is taking place.

Yet another object of the invention is to create no regions along the transport path that are preferred due to their displacement mode, but to ensure that the carriers carry out the required different displacement modes and/or patterns of movement via an individual control themselves in each case.

It is furthermore an object of the invention to avoid a mechanical coupling between the carriers so that no reciprocal mechanical influencing of the carriers among each other can take place.

It is finally an object of the invention to create a conveyor system for the displacement of carriers along a transport path, making it possible to bring about a modification of the transportation characteristics of the conveyor system.

SUMMARY OF THE INVENTION

A conveyor system has according to the invention an elongated guide defining a closed transport path extending through a plurality of treatment stations and a plurality of carriers movable on the guide along the path and each capable of holding a respective workpiece. At least one magnet is provided on each carrier, and an annular row of individually energizeable electromagnets extends along the path and is capable of exerting force on the magnets of the carriers so as to displace the respective carriers along the path. A plurality of sensors spaced along the path detect the carriers and generate outputs indicating positions and movement of the carriers along the path. At least some of the electromagnets at least intermittently form some of the sensors.

The operating method according to the invention entails subdividing the row of electromagnets into a succession of sections each having a plurality of the magnets, with each section substantially longer than the carrier length so that a carrier can move upstream and/or downstream in the respective section without colliding with upstream or downstream carriers. Positions and movements of the carriers are detected along the path in the sections, and in accordance with the detected positions and movements, the electromagnets of each section are energized individually so as to move a one of the carriers in the section in a displacement mode that can be different from a displacement mode of other carriers in other sections.

Thus according to the invention the objects of the invention are attained by a transportation method, in which each carrier is controlled individually along a closed transport path at least in sections and/or intermittently in its movement/displacement mode by means of a moving magnetic field that is individually created for each carrier. This is done according to the invention by providing individually selectable electromagnets arranged along a closed transport path and providing each carrier at least one magnet. Thus each carrier can be moved by electromagnetic interaction upstream or downstream along the transport path and can be individually controlled in its movement/displacement mode at least in sections and/or intermittently.

The system and method is thus characterized, with respect to the related art, in that no mechanical coupling exists between the carriers and that every carrier can thus be moved individually. In order to create such displacement, a magnetic field, particularly for every carrier, will be individually switched forward along the transport path from electromagnet to electromagnet such that the field moves along the transport path. This moving magnetic field can be created for example, by sequentially activating individual or several groups of electromagnets that are arranged along the transport path.

The moving magnetic field, which can be activated individually for each carrier by a system controller, is followed by a carrier because of an attracting or repelling interaction between the moving field and a magnetic field that is local with regard to the carrier, this magnetic field being created by at least one but preferably by a plurality of magnets that are arranged on the carrier. These can preferably be permanent magnets that create a static constant magnetic field. They can likewise for example be short-circuit rotors into which currents are induced by the magnetic field of the electromagnets, the currents in turn creating a magnetic field. It is also possible to form the magnetic field of the carriers by electromagnets, for example if a carrier has an individual power supply.

The conveyor system can in one embodiment be designed such that every carrier with its magnet(s) and with the electromagnets along the transport path, essentially forms an actuator, a linear actuator. The electromagnets can hereby be arranged along or on a guide, comprising for example a guide rail, on, at or in which the carriers run, for example by means of wheels that are mounted on the carriers.

As every carrier thus is a physical part of its own actuator, the rest of which is formed by the interactive electromagnets along the transport path, individual control of every individual carrier is possible, to which end the system controller mentioned above can for example be used. The conveyor system can thus also be understood in that the transport path and the guides or rather their electromagnets are designed for the carriers such that they represent one part each of an actuator, notably a linear actuator, preferably an electrically selectable part of a linear actuator.

According to an aspect of the invention, it can also be intended for the logical organization of a transportation method for the electromagnetic actuator to be divided logically into one first and one second actuator, notably linear actuator, for the displacement of the carriers. The first logical actuator can for example affect all carriers jointly and similarly with the same displacement mode, for example all moving at the same speed with a constant spacing. Furthermore, the second logical actuator can affect every carrier individually, moving for example some carriers in steps, some forward at slow speed, some stationary, etc. It is also possible that the displacement of every carrier along the transport path is created by an overlay of the displacements of the joint first logical actuator and the second logical actuator, effective particularly locally only with a relevant carrier. It can also be intended, to ensure the movement by a system controller by means of any other control concept.

In an embodiment where the magnets of the carrier are permanent magnets, every carrier can be understood as a passive element of the actuator, the passive element being in interaction with the electromagnets (active element) fixed along the transport path. By designing the carriers as passive, displaceable elements of an actuator, particularly linear actuator, within a closed transport path and the corresponding omission of electrical connections to the carriers, it is preferably possible to move the carriers for example in one direction along the notably closed transport path for an undefined amount of time.

The displacement of the carriers can hereby take place according to individual electrical actuation of the fixed electromagnets so that a force on the carriers can be generated, the carrier then being able to be moved along the transport path. Since only a specific number of the electromagnets that are arranged along the entire transport path affects each carrier, it is possible, depending on the actuation of the electromagnets affecting the magnets of a specific carrier, for example to accelerate, decelerate or move the carrier along the transport path with a constant speed or fixedly position it with high accuracy at a desired position.

It can be intended in accordance with the invention, that every carrier located along the transport path can carry out an individual displacement mode specifiable by a system controller, such that the carrier can in certain sections moved with a constant speed or in steps, in that the electromagnets required for the respective position and for the respective time are actuated accordingly along the transport path.

To avoid collisions of adjacent carriers with each other, furthermore in accordance with the invention, a specific portion of the entire transport path, called section in the following, is defined for each carrier, the carrier being able to carry out individual displacements in the section it in, with the system operated so that there is normally never more than one carrier in a section at a time. The sum of the lengths of all sections can equal the entire path length of the transport path, and the number of the sections corresponds to the number of carriers located along the transport path.

However, it can also be possible in accordance with the invention, to select a number of sections differing from the number of the carriers in order to move a plurality of carriers within a section similarly and simultaneously, or to for example define sections, in which no carrier is located. The sections represent regions limiting the individual displacements of the respective carriers. The sections can at the same time be regarded as transportation containers for the carriers, which, with an exemplary logical division of the actuator, are in turn similarly transported along the transport path in a specified speed of the first logical linear actuator.

It can be intended in an embodiment in accordance with the invention that the sections each have the same size and the same distance to each other. A movement profile specified for the first logical linear actuator by a system controller is thus transferred equally to all sections without changing their respective relative position to each other along the transport path.

According to a second embodiment in accordance with the invention, the sections in each case have different lengths and in each case are at a constant spacing from adjacent sections. A movement profile specified for the first linear actuator by a system controller is thus transferred similarly to all sections without changing their respective relative positions to each other along the transport path.

According to a third embodiment in accordance with the invention, the sections in each case have different lengths and their respective lengths can be changed by means of a system controller, and thus the spacings of adjacent sections can be changed. A movement profile specified for a first logical linear actuator by a system controller is thus transferred to all sections, wherein their respective movement profile additionally depends on the respective size of the section.

Furthermore, it can be intended in accordance with the invention, that every carrier and/or the transport path or the guide has sensors that determine the position and the respective movement parameters of every carrier and to generate additional and individual signals from this information if necessary, the signals for example being required in a specific region of the transport path or within a specific treatment station along the transport path. Such a sensor can also be formed by the coils of the electromagnets, arranged along the transport path, since the coils produce an induced voltage, provided a carrier with the magnets attached to it is moving in the surrounding region.

If for example a carrier with the objects to be printed and being placed thereon reaches a printing station that is provided along the transport path, a printing cycle signal is required for example, being adjusted individually to the position and the movement of the carrier in order to achieve an optimal printing result.

As the position and the movement parameters of the carrier are acquired by means of the sensor(s), a printing cycle signal can be generated by means of a system controller.

Generally, further individual signals can be generated beyond that, the signals being required for the individual movement control of the respective carriers at their respective position, for example for initiating printing, readjusting a position, a controlling handling or the like. The control signals of the system controller for the power supply of the electromagnets can for example thus be generated individually for every carrier by feedback of the signals or data of the sensor.

For controlling carriers and to avoid collisions of the carriers located along the transport path, it can be intended as already illustrated in accordance with the invention, to divide the length of the transport path within the sequential control via software into a plurality of sections. The number of sections can preferably correspond with the number of carriers located in the conveyor system. In a first embodiment in accordance with the invention, the sections can have the same length and at the same time be longer than the maximum length of a carrier provided with a workpiece.

As mentioned above, every carrier can be moved independently within the section allocated to it, for example by means of the second logical actuator, being assigned to every carrier. Furthermore in accordance with the invention, all the sections and their carriers have one movement component and are moved along the transport path at the same speed, that is with the same displacement mode, and the movement (first movement component) overlays the respective individual movements of the carrier within their sections (second movement component). The joint displacement mode can at least intermittently proceed accelerated, continuously or in steps.

It can be advantageous, as already described in the further embodiments in accordance with the invention, to design the number of the sections different from the number of the carriers, if that is required for a specific production sequence.

It can furthermore be advantageous to change the size of the respective sections depending on their absolute position along the transport path, if required for a specific production sequence. This can for example take place by the size of the sections in specific regions of the transport path being gradually or continuously increased or reduced by means of a system controller, and the sections in adjacent or other regions of the transport path simultaneously being reduced or increased accordingly, so that at any time the sum of the sizes of all sections corresponds to the length of the transport path. This type of variability is possible particularly because the sections merely represent limits for the individual movements of the carriers and are present exclusively virtually or in logical organization in the system controller, for example as part of the control program, and can thus be adjusted as desired.

Furthermore, it can be intended in accordance with the invention that every carrier within the section assigned to it can carry out an additional individual movement, effected by the electromagnets along the transport path, that are within the assigned section, being actuated by means of the position and movement parameters determined by the sensor in a way, such that at least logically a second linear actuator is formed, as already described above.

The actuation of the electromagnets can take place in accordance with the invention such that the respective carrier carries out a movement in addition to the movement of the first logical actuator, notably linear actuator, depending on the requirement. The movement can be accelerated, decelerated, continuous or opposite to the movement of the first actuator, notably the linear actuator, so that the carrier in the last-named case will remain stationary at least for a specific time and thus a stepped overall movement of the carrier is provided.

Furthermore in accordance with the invention the movements and the displacement modes of all carriers as well as the movement and the displacement mode of the sections can be freely programmable, so that changes or adjustments can be carried out in a simple manner by a program modification. Furthermore, in accordance with the invention, the named movements can be modified dynamically and/or interactively, it being possible to adjust the work movements by querying further sensors or by retrieving data from an internal or external database.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
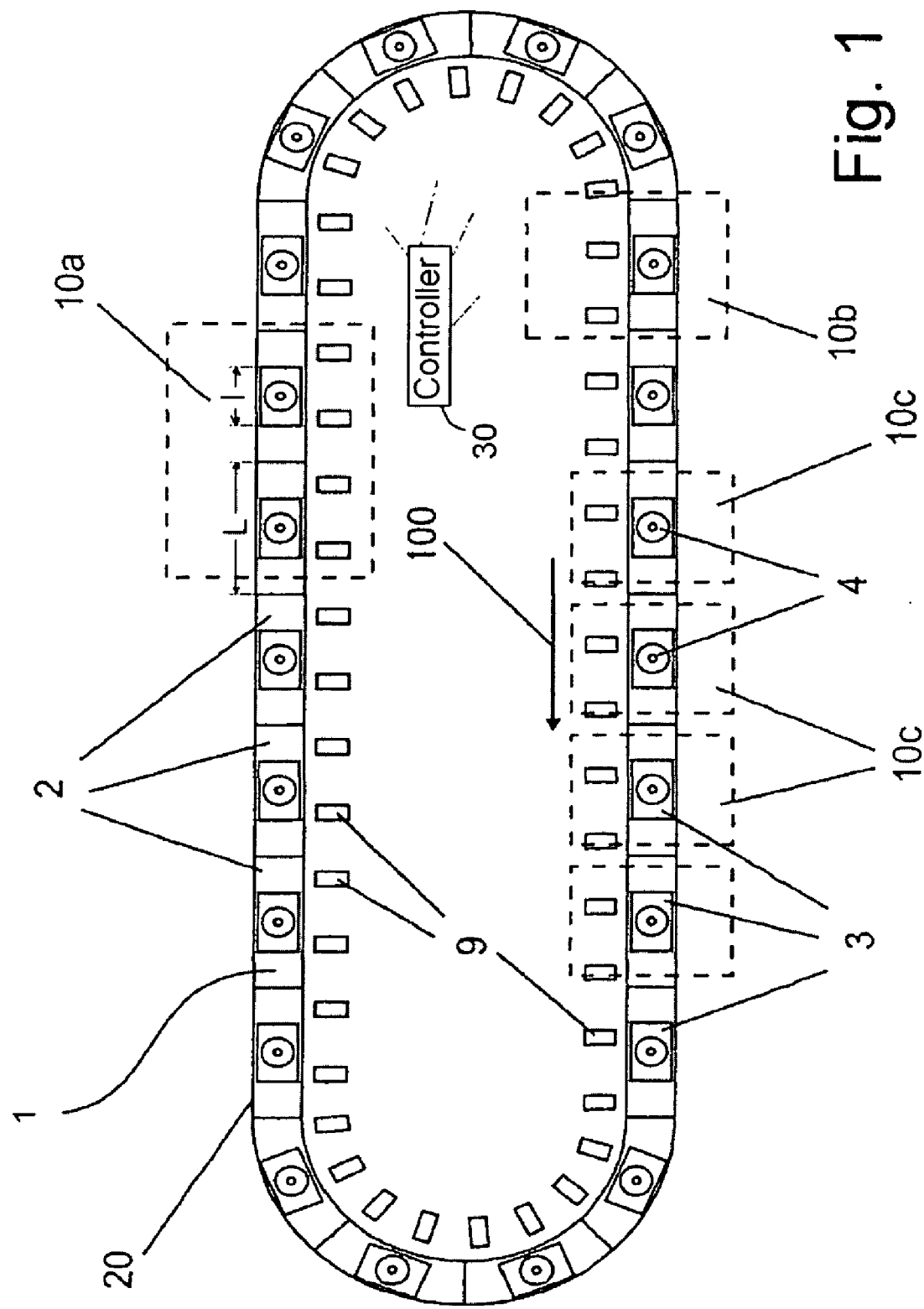
FIG. 1 is a schematic diagram of a closed transport path subdivided into sections of equal length with equispaced carriers.
Figure 6:
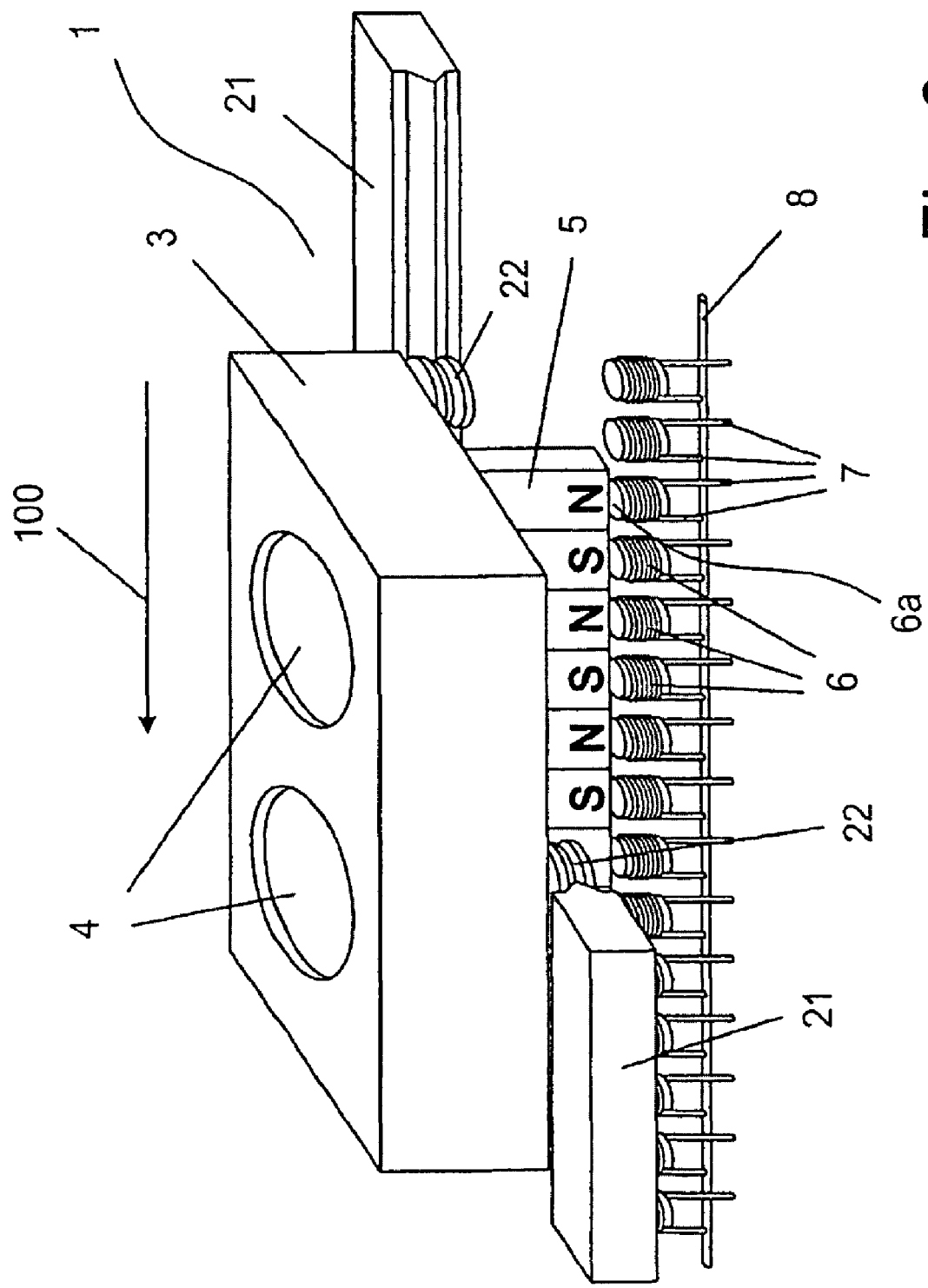
FIG. 6 is a perspective schematic view of a carrier and the fixed electromagnets.

As seen in FIG. 1 a conveyor system of a printing machine for the printing of optical data media such as CD's, DVD's or the like, or of smart cards, credit cards, telephone cards or the like or of another type of individual objects has a closed transport path 1 around which a plurality of similar carriers 3 can be moved on guides 20 formed by guide rails 21 (FIG. 6). Each carrier 3 for example has one or a plurality of seats or recesses 4 on its upper side for holding individual objects. The individual objects to be printed, such as for example a CD, are each set in a respective one of these recesses and fixed in position by unillustrated clamps.

Although the method in accordance with the invention explained in the below and the embodiments in accordance with the invention are substantially independent of the type of objects being transported, for the sake of convenience CD's will be referred to by way of example in the following, without limiting the application to CD's. The application is likewise not limited to a printing machine even though one is described here by way of example.

The CD's placed on the carriers are moved downstream in a transport direction 100 along the transport path 1 such that the CD's pass through different treatment stations 10a, 10b, and 10c in which different treatments are carried out on the CD's depending on the type and design of the respective treatment station.

The treatment station 10a can for example comprise a handling or loading system that takes the CD's off unillustrated supply stacks and places the CD's in the recesses of the carriers 3. The treatment stations 10b and 10c subsequently traversed by the carriers 3 can for example comprise printing stations where the surfaces of the CD's are printed with a monochrome or polychrome image with different printing methods such as silkscreen, flexo printing, offset printing or inkjet printing or another printing method.

Depending on the type of the treatment stations 10a, 10b, and 10c and the treatment carried out, a different displacement mode of the carrier 3 may be required within the respective treatment station, such as for example continuous movement for offset printing of the CD surface, or a stepped movement as is frequently required in printing with a silkscreen method, or an acceleration or deceleration such as required in the transition regions between continuous and stepped movement.

In accordance with the invention, the transport path 1 is subdivided into individual logical sections 2 each assigned to one of the carriers 3. The sections 2 thus exist exclusively virtually or rather logically, for example in the memory of a system controller 30 and represent the limits as already explained within which the respective assigned carriers 3 can move.

The section length L is selected as shown in FIG. 1 such that all sections 2 have the same length L and add up to the length of the entire transport path 1 divided by the number of carriers 3 located on the path 1. Furthermore, a carrier length 1 is shorter than the section length L so that every carrier 3 can be moved within the section 2 assigned to it without colliding or hindering an adjacent carrier 3.

Furthermore, sensors 9 are spaced along the transport path 1 at specific intervals, around two or three to a section 1a, so that the positions and movements of the carriers 3 can be monitored and recorded, as already described. The sensors 9 feed data to the system controller 30 and processes it in accordance with its programming.

Movement of the carriers 3 along the transport path 1 in the travel direction 100 takes place, as already described, in that the sections 2 are moved with the respective carriers 3 along the transport path 1 with a common displacement mode. This movement is overlaid by a displacement that is distinct for each carrier 3, the displacement being adjusted to the requirements at the respective position of the carrier 3 along the transport path 1 and being furthermore checked and controlled by the system controller in accordance with the sequence program and the data received from by the respective sensors 9.

Figure 2:
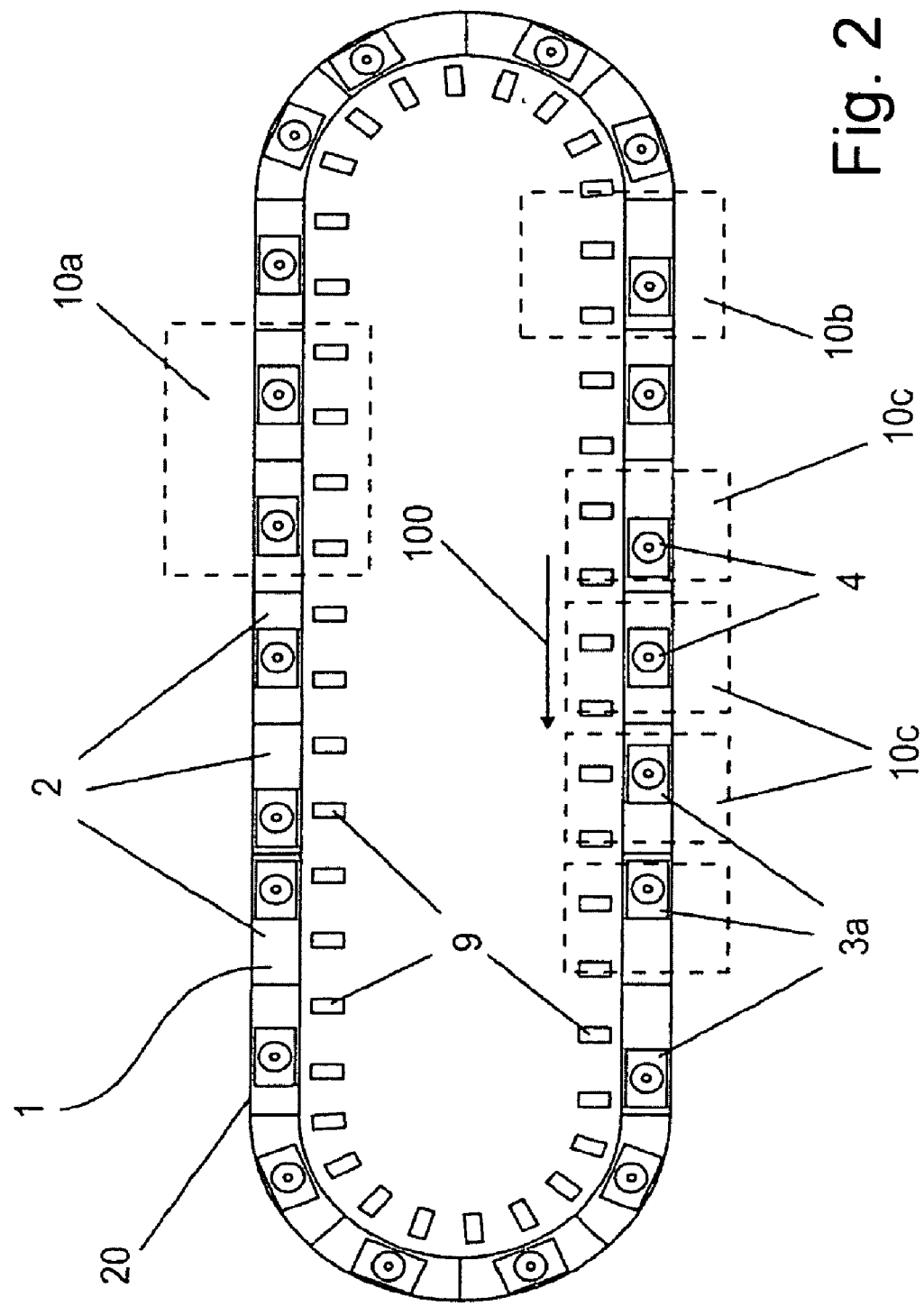
FIG. 2 is a schematic diagram of a closed transport path with sections of equal length but carriers in a nonuniform distribution.

FIG. 2 shows an inventive schematic illustration of a conveyor system of a printing machine according to FIG. 1, where the carriers 3 are in different positions 3a by way of example, as can be the case at a specific time during a production sequence. It is easy to recognize that each carrier 3 moves only within the section 2 assigned to it, the actual distances of adjacent carriers 3 from one another differing while the relative orientations of adjacent sections 2 will invariably be the same.

Figure 3:
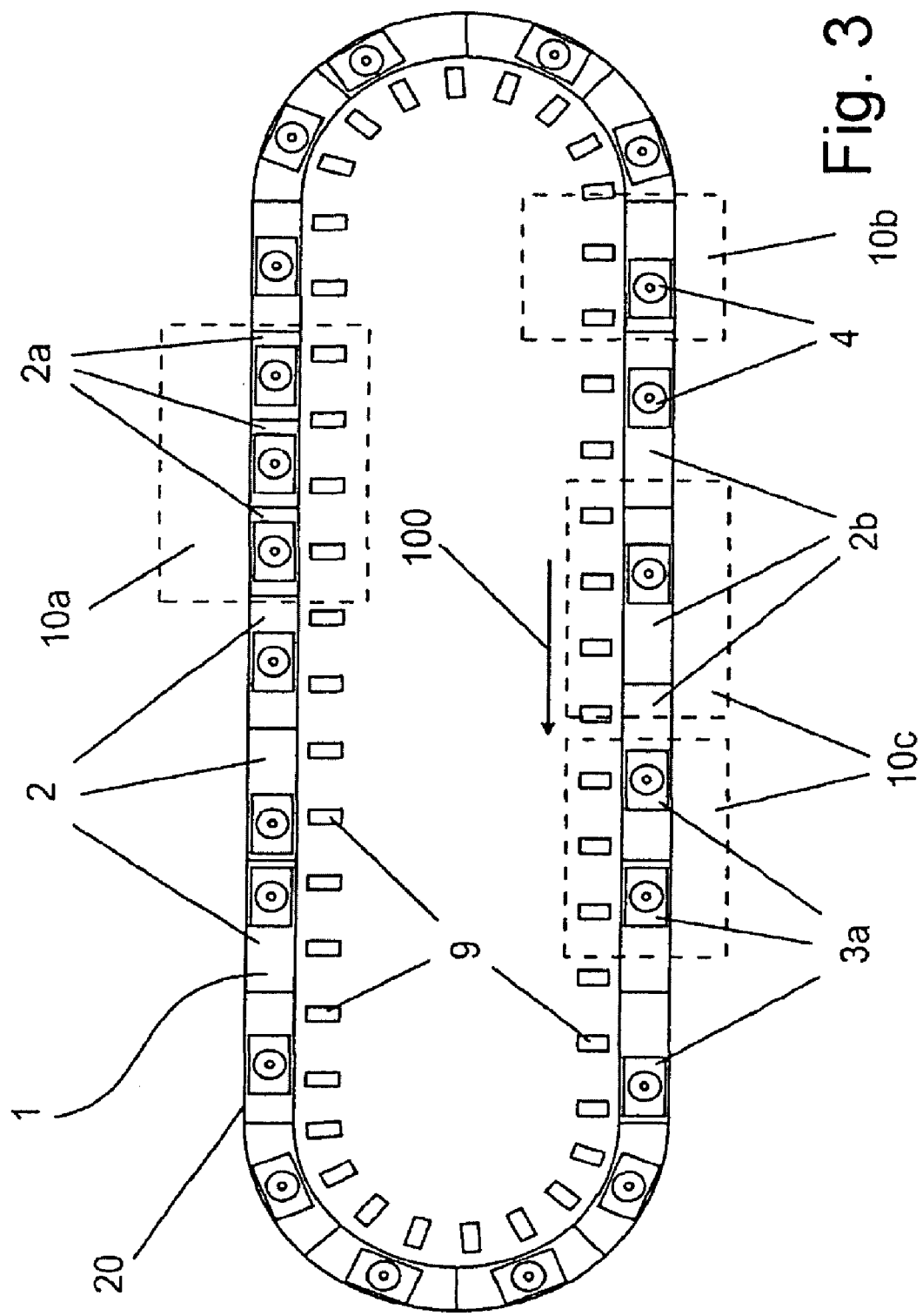
FIG. 3 is a schematic diagram of a closed transport path with sections of different length and carriers in a nonuniform distribution.

FIG. 3 shows an inventive schematic illustration of a conveyor system of a printing machine according to FIG. 1, however, with the difference that it has sections 2a of various different lengths. The sections 2a in the region of the treatment station 10a for example are shorter than the standard sections 2 along the rest transport path 1 and the number of carriers 3 on it, which is for example required for the fast treatment, e.g. loading and unloading, done in the treatment station 10a. At the same time, there are sections 2b that are longer than the standard length L of the sections 2, so that the sum of all lengths of all sections remains constant and equals the fixed overall length of the transport path 1.

Figure 4:
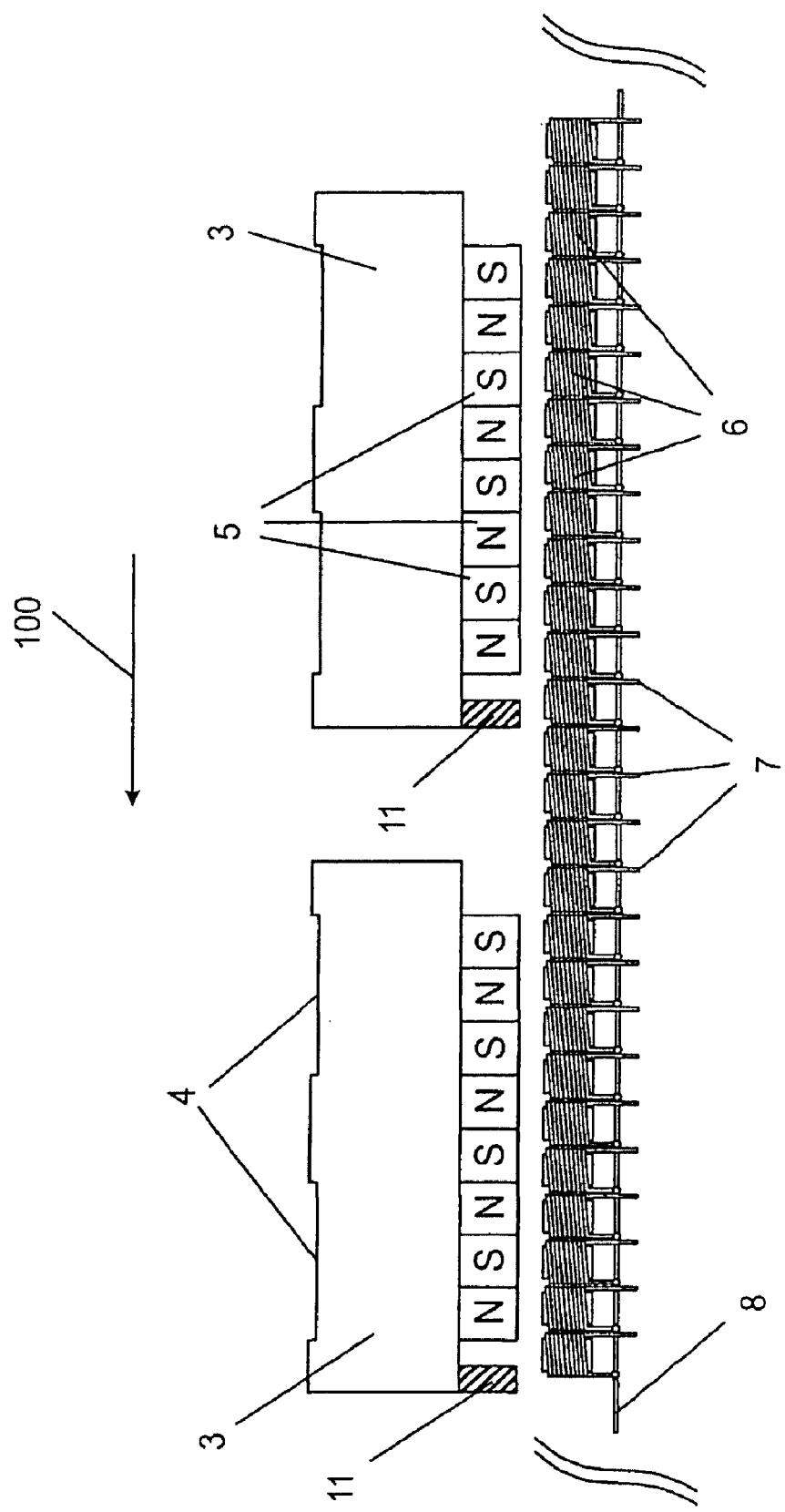
FIG. 4 is a schematic side view showing the interaction of carriers having permanent magnets with fixed electromagnets.

FIG. 4 schematically shows the interaction of carriers 3 and electromagnets 6 that fixed along the transport path. The carriers 3 are thus conducted along the transport path 1 by means of guide rollers 21 that are mounted on the carriers 3 and that, as shown in FIG. 6, ride on the two parallel guide rails 21 forming the guide 20 in turn defining the path 1.

A row of permanent magnets 5 with alternate polarity are for example as shown in FIG. 4 arranged on the bottom side of the carriers 3 such that the permanent magnets 5 interact with the electromagnets 6 fixed in a continuous row along the transport path 1. The spacing of the electromagnets 6 in the direction 100 can either be equal to or different from the spacing of the poles of the permanent magnets 5 depending on the embodiment, so that force can be exerted in simple manner along the travel direction 100 or opposite to the travel direction 100 depending on the embodiment and type of actuation of the electromagnets 6.

It is irrelevant for the actuation type of the carriers 3 in accordance with the invention whether the permanent magnets are provided with pole pieces or cages in order to thereby increase or optimize the magnetic flux effective on the electromagnets. It is likewise irrelevant that the electromagnets interact with the permanent magnets in one direction or two.

A sensor 11 on each carrier 3 interacts with respective the sensors 9 along the transport path 1 for inductively, optically or capacitatively for information exchange or identification. Respective position and movement signals are hereby generated for every carrier 3 at its current position, the signals being acquired, evaluated and processed by the system controller 30 such that the individual position and movement parameters are known for every carrier 3 at any time. This information, which is individual for every carrier 3, is further used by the system controller 30 to control the displacement mode of the carriers 3 depending on their current positions. This type of data acquisition and movement control makes it possible to control every carrier 3 along the entire transport path 1 and particularly within its assigned section 2 individually.

In another preferred embodiment in accordance with the invention a part of the coils of the fixed electromagnets 6 along the transport path 1 act as inductive sensors in place of the sensors 9 and 11 at least intermittently. As the permanent magnets 5 of the carriers 3 move past the coils that are operated as sensors, a voltage is induced in the coils whose level and phase can be detected and evaluated by the system controller 30.

The current position, speed, travel direction and acceleration of every individual carrier 3 can thus be determined via the strength of the measuring signals and the phases thereof by processing in the system controller. It is also possible to individually control every carrier 3 along the entire transport path 1 in its displacement mode, particularly within its assigned section 2.

To operate the electromagnets 6, their coils have connections 7 that are connected to the respective driver circuits of the system controller. It can be useful to combine a connection 7 of every coil into a joint connection 8 in each case, which is positioned on a joint electrical potential, for example ground potential.

Figure 5:
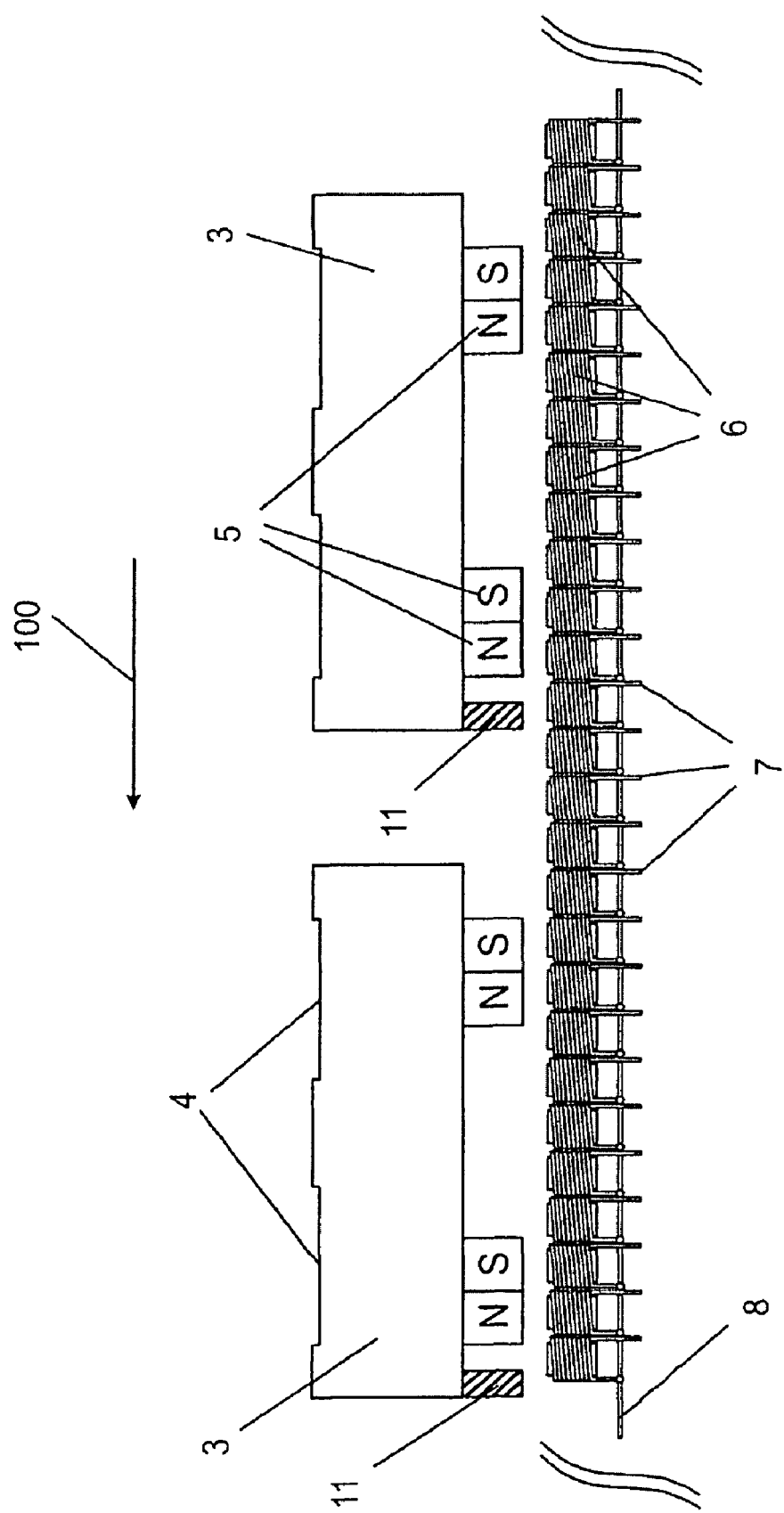
FIG. 5 is another side view like FIG. 4 but showing carriers each having only two permanent magnets.

FIG. 5 shows another inventive embodiment, having two pairs of permanent magnets 5 attached to each carrier, the magnets 5 being preferably designed as cylinders. In addition, the magnet cylinders 5 have a diameter and a relative spacing that is such that an effective movement of the carriers 3 along a closed transport path 1 is also possible in the curves of the transport path 1, without the magnet cylinders hitting elements of the transport path 1 such as for example the guide rails 21, electromagnets 6, sensors 9 or the like at any position along the transport path 1. Thus it is possible to use this type of operation even in the curves of the closed transport path 1, where such movement can be a problem.

It can be useful, particularly in the curves of the closed transport path 1, to increase the drive gap between the permanent magnets 5 at the carriers 3 and the actuating electromagnets 6, in order to enable unproblematic movement of the carriers 6.

The associated reduction in force on the carriers 3 and a possibly associated lower positioning accuracy is permissible in the curve regions, since the processing stations with high accuracy requirements are arranged along the straight sections of the transport path.

FIG. 6 shows in perspective a carrier 3 that carrier 3 has on its top side two recesses 4 into which CD's to be printed are inserted and fixed in their position with unillustrated clamps. A continuous row of permanent magnets 5 with alternating vertical polarity are arranged on the carrier 3, the permanent magnets 5 interacting with the electromagnets 6 fixed in a continuous row with vertical polarity along the transport path 1.

The electromagnets 6 are separated by a small gap 6a from the lower ends or poles of the permanent magnets 5, so that an ideal force interaction is achieved between the electromagnets 6 and the permanent magnets 5 and thus on carriers 3 with simultaneous optimized freedom of movement. In order to move the carriers 3 mechanically along the transportation in a defined manner and to invariably ensure a defined distance 6a of the magnets 5 to the electromagnets 6, the guide rails 21 are fixed attached along the transport path 1, and the feed rolls 22 are attached to every carrier 3 to roll on the guide rails 21. The rollers 22 are grooved and fit with ridges on the rails 21 to hold the carriers 3 at a predetermined vertical spacing above the horizontal rails 21. It can be useful to mechanically prestress at least one of the feed rolls 22 horizontally outward with a spring force, in order to ensure that the feed rolls 22 are locked on the guide rails 21.

Figure 7:
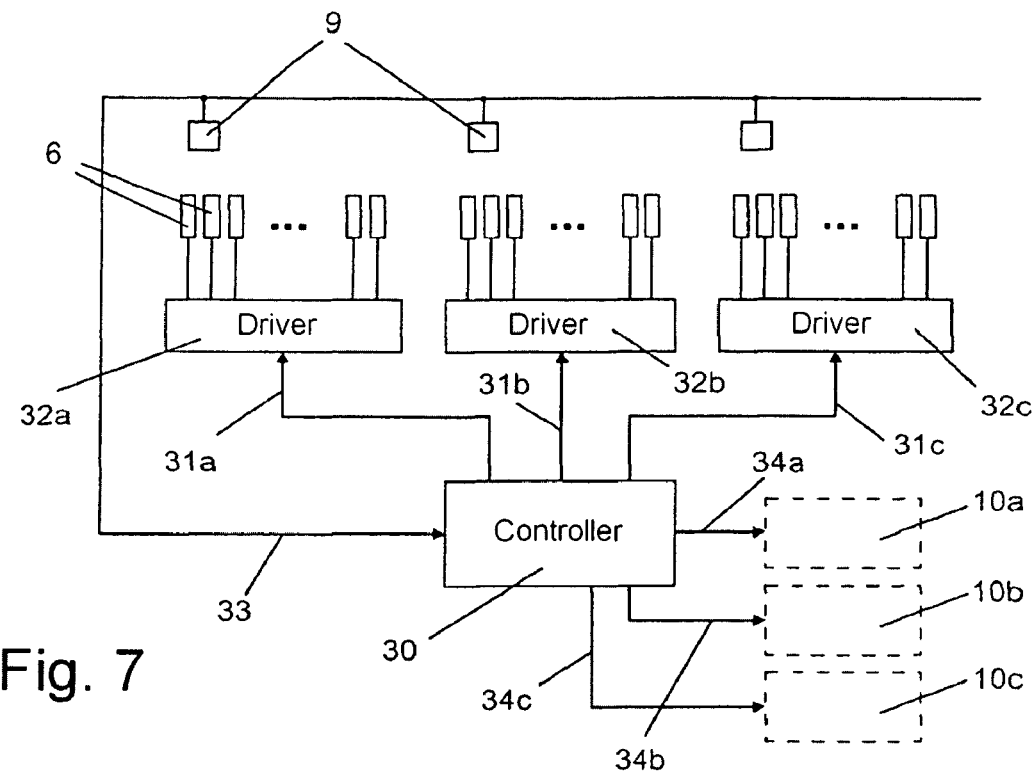
FIG. 7 is a diagram illustrating a first embodiment of the invention.

FIG. 7 schematically shows a first inventive control concept. The system controller 30 controls driving stages 32a, 32b, and 32c via respective control lines 31a, 31b, and 31c, and the driving stages in turn control the electromagnets 6.

It is thereby intended in accordance with the invention to combine a specific number of electromagnets 6 into one group A, B, C, or the like, which is controlled by the respective drivers 32a, 32b, and 32c, and the like.

It is hereby possible to create a transport path that can be reconfigured for a specific application from a plurality of modules, so that a high flexibility is ensured even during the initial setup of the conveyor system. The signals acquired from the sensors 9 are delivered to the system controller 30 via a data link 33, the system controller 30 serving to evaluate and process the data. The actual sequential control takes place in the system controller 30 in accordance with a control program that can not only control the movements and the positioning of the carriers 3 along the transport path, but also the sequences and functions in the processing stations 10a, 10b, and 10c via respective data links 34a, 34b, and 34c.

Figure 8:
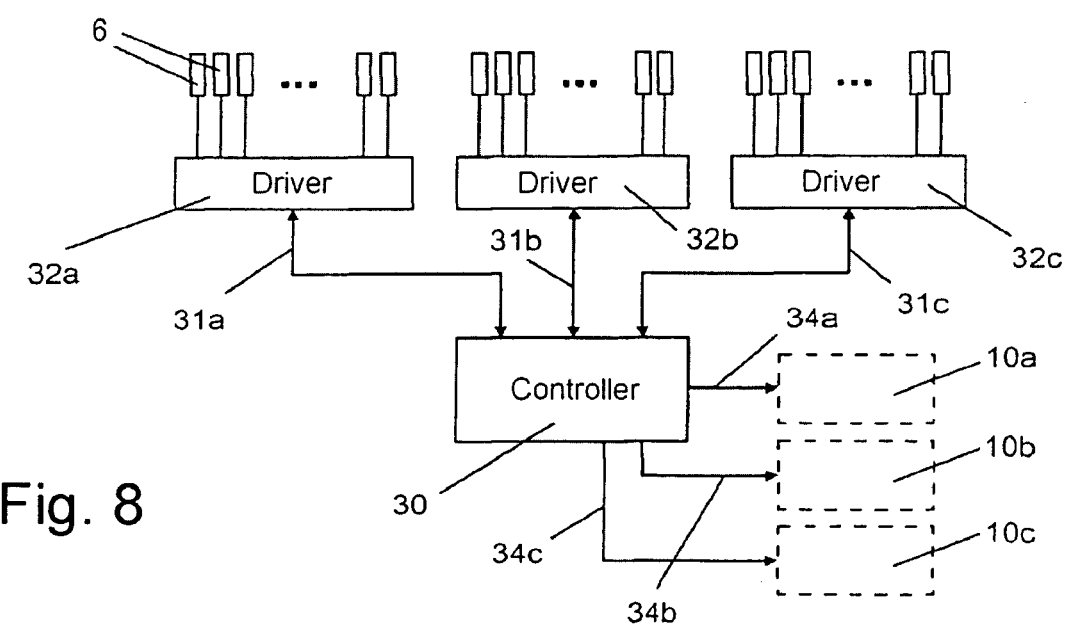
FIG. 8 is a diagram illustrating a second embodiment of the invention.

FIG. 8 schematically shows a second inventive control concept where one part of the electromagnets 6 is in each case switched as sensors in place of the sensors and the position data and movement parameters are acquired via these electromagnets as described. The data links 31a, 31b, 31c are designed as bidirectional between the system controller 30 and the driver modules hereby.

The method described below can be carried out generally independent of the abovementioned embodiments in accordance with the invention, the carriers 3 being moved to a specific reference position in the beginning of execution of a control program in order to create a reference state.

Since every carrier 3, in switched-off state of the conveyor system, can be positioned along the transport path at random, it is generally also possible for example to arrange all the carriers 3 in a continuous row, that is longitudinally abutting, so that a plurality of carriers 3 will then lie in one section in whole or in part.

Since the system controller 30 has not stored any information on the number of sections and their position along the conveyor system in the internal memory, after switching on the conveyor system and at the start of the execution of the control program, appropriate data can in a first step generally be given to the electromagnets such that all carriers 3 are moved similarly with a lower speed around the path 1, such that the sensors 11 attached to the carriers 3 can interact with the fixed sensors along the transport path 1.

A signal is delivered to the system controller 30 from the sensors 9 of every section 2, 2a or 2b at which a carrier 3 is located at this time, the number of carriers 3 and their present positions being continuously determined. In a second step, all the carriers 3 can now be moved by actuation of the respective electromagnets relative to each other along the transport path 1 such that all the carriers 3 are at the same spacing from the carriers 3 upstream and downstream and thus the spacing of the carriers 3 corresponds to the length L of one standard section 2.

The positions of the carrier 3 are thus unambiguously determined at this time and forms a reference state. It is naturally also possible to adopt as reference state an arrangement of the carriers 3 along the transport path that is stored in a read-only memory of the system controller 30, the carriers 3 in the reference state for example lying more closely together at one specific region. Thus the carriers 3 are oriented according to the stored pattern.

It is of course also possible to carry out this type of reorientation several times in succession or at specific times in order to, for example, recreate the same original state between succeeding different operational sequences.

With regard to all embodiments it must be stated that the technical features described in connection with an embodiment can be used not only with the specific embodiment but also with the other embodiments. All described technical features of the invention are to be considered essential to the invention and can be randomly combined with each other or used exclusive of each other.

We claim:

1. A conveyor system comprising:
   an elongated guide defining a closed transport path extending through a plurality of treatment stations;
   a plurality of carriers movable on the guide along the path and each capable of holding a respective workpiece;
   at least one magnet on each carrier;
   an annular row of individually energizeable electromagnets extending along the path and capable of exerting force on the magnets of the carriers so as to displace the respective carriers along the path; and
   means including a plurality of sensors spaced along the path for detecting the carriers and generating outputs indicating positions and movement of the carriers along the path, at least some of the electromagnets at least intermittently forming some of the sensors.

2. The conveyor system defined in claim 1 wherein the row of electromagnets is subdivided into groups of electromagnets forming respective sections of the path, the system further comprising
   control means for energizing each of the groups independently of the other groups to form a respective linear actuator.

3. The conveyor system defined in claim 2 wherein the electromagnets are equispaced along the path at a spacing that is a small fraction of a length measured parallel to the path of each of the carriers.

4. A method of operating a conveyor system having:
   an elongated guide defining a closed transport path extending through a plurality of treatment stations;
   a plurality of like carriers of predetermined length movable on the guide along the path and each capable of holding a respective workpiece;
   at least one magnet on each carrier; and
   an annular row of individually energizeable electromagnets extending along the path and capable of exerting force on the magnets of the carriers so as to displace the respective carriers along the path,
the method comprising the steps of:
   subdividing the row of electromagnets into a succession of sections each having a plurality of the magnets, each section being substantially longer than the predetermined length;
   using at least some of the electromagnets at least intermittently as sensors;
   detecting positions and movements of the carriers along the path in the sections with the sensors; and
   in accordance with the detected positions and movements, energizing the electromagnets of each section individually so as to move a one of the carriers in the section in a displacement mode that can be different from a displacement mode of other carriers in other sections.

5. The method defined in claim 4 wherein the magnets on the carriers are permanent magnets.

6. The method defined in claim 4 wherein the electromagnets are operated individually.

7. The method defined in claim 4 wherein the electromagnets can be operated in a synchronous displacement mode for displacing all the carriers synchronously around the path at generally the same speed, or in a section mode group-wise with carriers in different sections being operated with different displacement modes.

8. The method defined in claim 7 wherein when the electromagnets are operated group-wise at least one carrier is moved in steps through the respective section.

9. The method defined in claim 7 wherein the electromagnets are operated individually in the section mode.

10. The method defined in claim 7 wherein the two modes are overlain.

* * * * *